Figure 1:
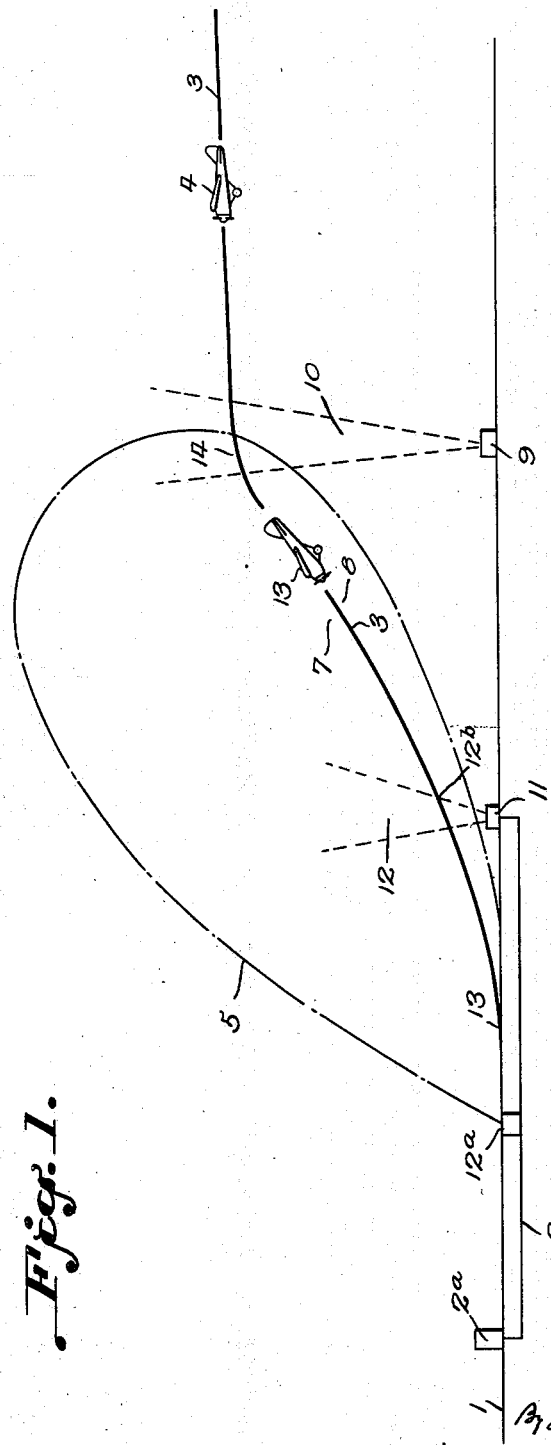

Patented Oct. 18, 1938

2,133,285

UNITED STATES PATENT OFFICE 2,133,285

RADIO SYSTEM FOR AUTOMATIC CONTROL OF AIRCRAFT, AS DURING LANDING

Francis W. Dunmore, Washington, D. C., assignor to the Government of the United States of America, as represented by the Secretary of Commerce Application March 3, 1936, Serial No. 66,979

10 Claims. (Cl. 244—1)

(Granted under the act of March 3, 1883, as amended April 30, 1928; 370 O. G. 757)

The invention described herein may be manufactured and used by or for the United States Government for governmental purposes without the payment of any royalty thereon.

This invention relates to means for controlling aircraft and aims generally to improve the same. Particularly, but not exclusively, the present invention aims to provide means capable of automatically effecting at least vertical control of an aircraft oriented with respect to a properly equipped landing field in such manner as to automatically effect proper descent and landing of the aircraft. The invention further contemplates the employment of means to automatically effect other control of the aircraft, capable of rendering the entire landing operation automatic, and may be arranged to enable selection of automatic landing by the pilots, and to be subject to substitution in part or in full by manual or other control at the will of the pilot.

In one preferred form, my invention may employ a radio glide beam and dual marker system as disclosed in my copending application, Serial No. 627,625, filed August 5, 1932, used in conjunction with means for automatically effecting any or all of the maneuvers of landing.

Heretofore it has been necessary for a pilot to perform many operations during a blind landing, taxing his skill to the utmost. With the herein disclosed system for automatically controlling the aircraft during the glide, the pilot may merely set into operation an automatic air speed control and start the aircraft off on a runway localizer course some 6 or 7 miles out from the field, preferably at a predetermined altitude. The lateral controls, if desired, may be automatically operated by the localizer signals. With one form of my invention, when a far marker signal is received (the point at which the glide is started) the pilot may be advised to adjust the sensitivity of the landing beam receiver to give the standard output to be used during the glide. With other forms of my invention, as set forth hereinafter, standard sensitivity adjustments may be employed and the far marker, or the landing beam, may be utilized to initiate the glide without sensitivity adjustment, and other modifications may also be made within the scope of the invention. The far marker or other glide initiating signal may also operate means which takes the vertical control from the automatic pilot and puts it on the output of the landing beam receiver so that the aircraft is held on the glide path. The far marker or other initiating signal may also provide sudden movement of the elevator so that the aircraft is put immediately in the glide position and thereafter controlled by the glide beam. The automatic air speed control provided by my invention may be used so that the aircraft will follow the glide path at a predetermined air speed. The manual setting of sensitivity of the glide beam receiver which is preferably employed in the first mentioned embodiment of my invention, need be used even then only when the plane hits the marker and beam at some altitude other than that predetermined as standard. When the aircraft reaches the near marker, its signal may be utilized to put the air brakes into operation; to lower the tail sufficiently for putting the aircraft in a position for landing, and to cut the engine speed down to that proper for landing, or for any of these purposes. After the wheels touch the ground the pilot may operate the wheel brakes and control the engine speed in the usual manner.

Thus among the objects of the present invention, in various combinations and severally, the following are noteworthy: the provision of glide control means responsive to the character of a glide beam for automatically maintaining the aircraft substantially on a glide course, as one leading to a landing locus; the provision of automatically responsive means for putting into operation the glide control means; the provision of automatically responsive means for controlling the aircraft at the initiation of glide; the provision of automatically responsive means for advising the pilot of approach to a point of control change; the provision of automatic glide initiating means adapted to deliver full control of the glide to the glide control means after initiation of glide; the provision of means for automatically holding a substantially constant air-speed during glide; the provision of automatically responsive means for placing one or more controls of the aircraft in altered attitude, as in landing condition; the provision of improved means for automatically effecting adherence to a glide path, of general application; the provision of improved means for automatically maintaining a constant air speed, of general application; the provision of means for automatically operating controls of aircraft responsive to control signals, as those of marker beacons, generally.

Other and further objects of my invention will be apparent from the following detailed description and accompanying drawings. It is expressly understood, however, that these drawings are for the purpose of illustration only and are not designated for a definition of the limits of my invention.

Referring to the illustrations:—

Figure 1 is a diagrammatic representation of a landing field with two marker beacons and a landing beam transmitter producing a landing path in the vertical plane, and also including a runway localizer beacon.

Figure 2:
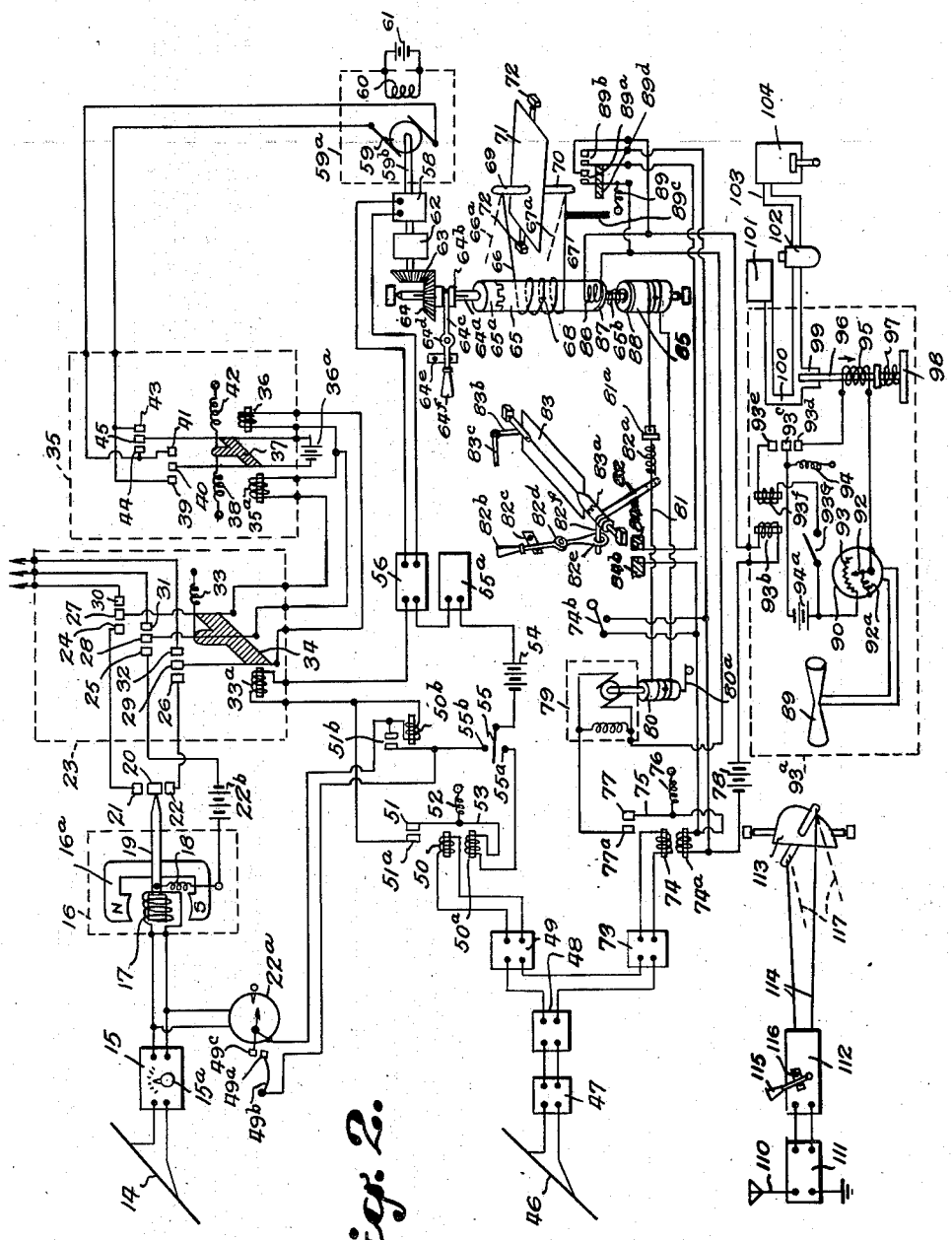

Figure 2 is a diagram of mechanism on the aircraft for receiving the landing beam signals and utilizing them to operate the elevator rudder of the aircraft, including illustrative means whereby the beam or far marker signals may be employed to cause the aircraft vertical controlling elements to be operated by the landing beam signals, also illustrative means whereby the near marker signal puts the aircraft in an attitude for landing, and further illustrative means for effecting automatic lateral control of the aircraft.

In the diagrammatic representation of Figure 1, there is shown generally a ground surface 1, landing area 2, preferably provided with a runway localizer beacon, as 2a and having a landing beam transmitter, as at 12a, with the point of contact as at 13. The field radiated by the landing beam transmitter 12a is indicated at 5, and a selected landing path to be followed by the airplane 4 is shown at 3. Above this path in region 7 the landing beam signal is of greater intensity than on the landing path, and below this path in region 8 it is of less intensity. In the illustrative embodiment there is also shown a far marker beacon located at 9 and a near marker beacon adjacent the border of the field at 11. These two marker beacons may operate on the same radio frequency but have distinctive modulation frequencies. The locus at which airplane 4 passes through field 10 of the far marker is shown at 14 and the point where it enters the field of the near marker 11 is shown at 12b.

This arrangement constitutes the ground transmitting equipment preferably employed in the practice of my invention.

In the illustrative embodiment of Figure 2 is shown an example of equipment which may be carried by the aircraft 4, Figure 1, to automatically control the aircraft in accordance with my invention and direct it along the course 3 (Figure 1) to the point of contact 13 (Figure 1). In Figure 2, 14 represents a receiving antenna for the reception of the landing beam signal 5, Figure 1. 15 represents a receiving set connected to this antenna with manually-operated volume control 15a. Receiver 15 has a rectifying device in its output so that a direct current is delivered to landing beam course indicator 22a connected to the output of this receiver. A second landing beam course indicating device 16 is connected in parallel with 22a. This device consists of a moving coil element 17 operating in the field of permanent magnet 16a. Arm 19 is connected to moving coil 17 with spring 18 for returning arm 19 to zero position. Arm 19 carries contacting element 20 which makes contact with element 22 when the current in coil 17 drops below a predetermined amount and makes contact with 21 when current in coil 17 increases above a predetermined amount. Contact 21 is connected to contact 24 of multiple-pole double-throw switch 23. Contact 22 is connected to contact 26 of switch 23. Contact 25 of switch 23 is connected through battery 22a to the moving arm 19 of course indicator 16. Switch 23 has moving contacts 27, 28 and 29 which make contact with terminals 24, 25 and 26 respectively when magnet coil 33a is excited, and make contact with terminals 30, 31 and 32 respectively when magnet coil 33a is not excited. Magnet coil 33a operates with armature 34 to move contacts 27, 28 and 29. Spring 33 holds contacts 27, 28 and 29 against 30, 31 and 32 respectively when magnetic coil 33a is not excited. The object of switch 23 when closed to the left or when 33a is excited, is to connect contacts 20, 21 and 22 of course indicator 16 such that they will operate reversing switch 35, which reverses the direction of rotation of armature 59 of motor 59a. Switch 35 consists of a moving armature 37 carrying contacts 40 and 45 which make contact with 39 and 44 respectively when coil 35a is excited by the closing of contacts 20 and 21 on course indicator 16, and make contact with contacts 41 and 43 respectively when magnet coil 36 is excited by means of contacts 20 and 22 closing on indicator 16. Springs 38 and 42 serve to hold armature 37 in a central position when contact 20 of indicator 16 is in a central position. Battery 22a furnishes the excitation current for coils 35a and 36.

The operation of reversing switch 35 by the movement of contact 20 causes armature 59 of motor 59a to operate in one direction when reversing switch 35 closes contacts on the left and in the other direction when switch 35 closes contacts on the right. Motor 59a has a field 60 and exciting source 61. Armature 59 drives shaft 59b which is connected through timing device 58 to reduction gear 62, which in turn operates bevel gear 63. The purpose of timing device 58 is to permit the operation of gear 63 only for a certain period of time out of a given element of time. In other words, if armature 53 receives energy from battery 36a of such polarity as to cause it to rotate in a clockwise direction continuously, say for a period of 30 seconds, the timing device 58 may be arranged, for example, so that gear 63 will operate for a period of 5 seconds out of every 15 seconds of operation of armature 59. Bevel gear 63 works through bevel gear 64 (herein shown as splined on shaft 64a, as illustrative of an arrangement for taking over of manual control) and thus serves to rotate elevator rudder drive shaft 64a. In the embodiment shown, this drive shaft 64a is operably arranged to move the elevator rudder in response to the received landing- or glide-beam signal, by means of an elevator control drum 65 free on the shaft 64a but normally clutched thereto by suitable means, as the positive clutch 65a engaged under the influence of compression spring 65b. The elevator control drum 65, in the form shown, carries control cable 66—67 anchored to the drum 65 as at 68, and attached respectively to arms 69 and 70 controlling the elevator rudder 71 of the aircraft, shown as operating in pivots 72.

For the purpose hereinafter described, the drum 65 of this embodiment also has associated with it a magnetically operated clutch comprising, in the form shown, a magnet coil 86 and clutch discs 87 and 88, the disc 88 being carried by a second drum 85 rotatable about, but not longitudinally movable along, the shaft 64a; the spring 65b being recessed or otherwise arranged so as to permit the magnetic clutch 86—88, when energized, to disengage the drum 65 from positive clutch means 65a, and itself becomes operative to rotate drum 65 on rotation of drum 85.

As above noted, my invention further contemplates means to enable manual control of the elevator rudder 71 through normal control elements, as 66a and 67a, to be taken over by the pilot at any time, such means being embodied in the form shown, by providing gear 64 with a shifter collar 64b engaged by a shifter yoke 64c, pivoted as at 64d, and provided with means, such as detents 64e for retaining it in position to hold the gear 64 in engaged or disengaged relation to the gear 63, when the shifter lever 64f is thrown.

Thus there is provided in this part of my invention a means capable of responding to the landing- or glide-beam signal, operable to control the elevator rudders of the aircraft so as to maintain it on a selected glide course, subject to manual or other control being taken over at any time by the pilot, and subject also to control being taken over by further means in response to a predetermined signal, as hereinafter set forth.

Referring now to the marker beacon responsive means shown in Figure 2, there is illustrated at 46 receiving antenna for the signals from marker beacons 9 and 11 (Figure 1) connected to a receiver 47 including a detector, and having its output connected to modulation frequency amplifier 48, which serves to amplify the modulation frequencies of marker beacons 9 and 11, Figure 1. The output of the amplifier 48 is connected to filter circuits 49 and 73 which serve to separate the two modulation frequencies, 49 separating the modulation frequency of far marker 9, Figure 1, and 73 separating the modulation frequency of near marker 11, Figure 1. The output of 49 operates through magnet coil 50 on armature 53 and closes contacts 51 and 51a when excited.

The operation of these contacts energizes holding-coil 50a thus maintaining the contacts 51—51a closed after the coil 50 becomes de-energized and until the holding coil is de-energized, as by opening of the switch 55—55a, when spring 52 serves to return armature 53 to its normal position.

The closing of contacts 51—51a also excites relay coil 33a of multiple-pole double-throw switch 23 by means of the energy from battery 54. This operation of switch 23 is controlled by pilot's control switch 55 which is closed by the pilot when he desires marker initiated landing after he has put the airplane on the runway beacon course at a normal altitude. The closing of contacts 51—51a also initiates operation of a timing element 56 which operates once (and becomes reset on de-energization of coil 33a), operating for a predetermined length of time on timing device 58 to stop its timing means from operating and provide for direct drive through timer 58, thus allowing armature 59 to operate on rudder 71 continuously for a sufficient length of time in response to the closing of contacts 20 and 21 to nose the plane down when point 14, Figure 1, is reached. The closing of contacts 51 and 51a also give a visual or aural indication to the pilot through indicator 55a.

The output of filter 73 (modulation frequency of marker 11, Figure 1) operates through magnet coil 74 on armature 75 to close contacts 77 and 77a, the closing of which energizes holding coil 74a associated therewith. Spring 76 returns armature 75 to its normal position when coil 74 and holding coil 74a are not excited. When contacts 77 and 77a close, battery 78 operates motor 79. 79 operates drum 80 and control cable 81 fastened to drum 80 serving to operate air brakes 83 and drum 85 to put the aircraft in a landing attitude. This is accomplished, in the form shown, in a manner to insure that both the elevator rudder and the air-brakes will be fully set, by suitable compensating means.

The automatic operation of the air brakes 83 by the cable 81 is effected by means, herein the arm 82, associated with the air brakes and having a lost motion connection with the cable. In the illustrative form this lost motion connection is effected by having the cable 81 passed loosely through an eye in the arm 82 and providing the cable with an abutment member 81a which bears against the spring 82a interposed between the abutment member 81a and the arm 82. To limit movement of the air brakes 83 to fully set position, the arm 82 may at the end of its travel strike against stop element 84a moving it to a final position against stop element 84b after which further movement of the cable 81 will merely effect compression of the spring 82.

Means is also provided, in the form shown, comprising contacts embodied in the stop elements 84a—84b, for closing one opening in a shorting circuit for the holding coil 74a, which will serve to open contacts 77—77a if the shorting circuit is otherwise closed, but not to do so if it is elsewhere open.

Cable 81, in the form shown, is also arranged to operate drum 85, so that when coil 87 of the magnetic clutch is energized, releasing clutch 65a and engaging clutch 87—88, drum 65 will be turned by the motor 79 and cable 81, in a direction and sufficiently to move elevator rudder 71 to landing position.

To assure full setting of the elevator rudder 71 in landing position, and at the same time allow cable 81 to continue movement if that position is reached before the air-brakes 83 are fully set, any suitable means may be employed. As illustrative of such means there is shown in Fig. 2 a double-pole single-throw switch normally held open by spring 89, with one pair of contacts 89a arranged to short the magnetic clutch coil 86 and the other pair of contacts arranged to close one opening in the shorting circuit for the holding coil 74a. This double-pole single-throw switch may be closed by any suitable means when the elevator rudder 71 reaches the desired position, as by contact of a moving element 89c of the rudder system with the switch operating member 89d.

By means of the nature provided, when the elevator rudder 71 reaches the landing attitude the magnetic clutch 87—88 will be released by shorting of coil 86, enabling re-engagement of clutch 65a to hold the rudder in landing position. When not only contacts 89b but also contacts 84a and 84b are closed, the holding coil 74a will be de-energized, allowing contacts 77—77a to open and thus stopping operation of the motor 79 when the several elements operated by it attain the proper position. The closing of contacts 77 and 77a also cuts out automatic air speed control device 93a by exciting magnet coil 93b. Coil 93b opens contacts 93c and 93d which are held normally in a closed position by spring 94, and at the same time closes contacts 93c and 93e, which, switch 93g being closed, energizes holding coil 93f. 89 is the Venturi tube connected through line 91 to air speed indicator 90. This air speed indicator has an indicating element 92 with spring 92a for returning it to the zero position. Indicating element 92 operates on resistor 93 to change the amount of current flowing in coil 95 from battery 94a. Coil 95 is a solenoid with core 96 acting as a gasoline control valve at 99, serving to control the amount of gasoline from tank 101 flowing through line 100 to carburetor 102 which is connected through intake line 103 to airplane engine 104. Valve 99 is held in a predetermined position when coil 95 is not excited by means of spring 97 attached to base 98. The unit just described is an automatic air speed control for the purpose of holding the aircraft at a given air speed during the process of landing, and energizing of coil 93b, and thence coil 93f, serves to cut out its automatic operation, and allow spring 97 to cut the engine to idling speed as noted hereinafter.

This part of the invention also contemplates suitable means to enable manual control to be taken by the pilot at any time: herein shown as a shorting switch 74b for shorting the holding coil 74a to render motor 79 ineffective; as shifter lever 82b with detent means 82c, pivot 82d, eye 82e, and shifter ring 82f enabling control 82 to be de-clutched from the air brakes 83, at 83a, so that the air brakes may be subject to normal or other control, as through the arm 83b and rod 83c; as shifter lever 64f above described; and as switch 93g adapted to be opened to allow contacts 93c and 93d to close so that the automatic air speed control 93a will again admit fuel to the engine 104.

Suitable means is also provided to enable resetting of the devices operated by near marker beacon 11 energizing coil 74, herein indicated by the crank-handle 80a by which drums 80 and 85 and their associated parts may be returned to starting position.

As above noted, the aircraft is also preferably equipped with means for effecting automatic lateral control during landing, as well as during flight if desired, one form of such means being indicated in Fig. 2, which shows antenna circuit 110 with a receiver 111 for receiving the signals of the runway localizer beacon 2a (Fig. 1), connected with means 112 for automatically controlling the lateral rudder 113 through cables 114 to maintain the ship automatically on the runway localizer course, and provided with means, as shift lever 115 and detent elements 116, to enable automatic control to be discontinued at the will of the pilot, so that manual control may be effected by other means, as cables 117. This means for effecting automatic lateral control may be of any suitable type, preferably, but not necessarily, being constructed in accordance with my copending application entitled "Means for holding aircraft automatically on radio beam course."

The system as so far described, is adapted to be set in operation by the signal of the far marker beacon 9 (Fig. 1), but in the event such far marker beacon signal is not available, means is also provided for initiating operation of the automatic landing means in response to other signals; in the form shown, Fig. 2, when no far marker beacon signal is available, or desired to be used, the pilot may close the single pole double throw switch 55, not on point 55a, but on point 55b, and employ a standard setting of the volume control 15a instead of adjusting it to bring the indicator 22a to zero. The switch point 55b is in this form connected to a contact 49a, preferably carried on a spring arm 49b, and positioned to be contacted by contact 49c, movable with the indicator element of beam course indicator 22a, when the beam 5 (Fig. 1) has been entered to such extent as to bring the beam course indicator 22a to a predetermined position, conveniently the zero position corresponding to the setting of volume control 15a. The closing of contacts 49a—49b at this time energizes holding coil 50b, which closes contacts 51b, maintaining the circuit from battery 54 through elements 33a, 55a, and 56, initiated by contacts 49a and 49c. In this way a selected intensity of field 5 is made to initiate operation of the automatic controls, in lieu of the far marker signal 10, and the indicator 55a advises the pilot that automatic control has so been initiated.

Clearly, the several means for shifting from automatic to manual control, herein shifters 64f, 82b, and 115, and switches 55, 74b and 93g, may be brought together for unit control.

The method of operation of the illustrative system for automatic control of an aircraft in accordance with this invention may best be illustrated by a typical example of its use. Considering Fig. 1, the aircraft may be considered as being held automatically on the runway course by means 110—116 (Fig. 2) as described in my last mentioned copending application and in the position as shown at 4, Figure 1. At this point with a far marker beacon 9 available, the pilot closes switch 55—55a, Figure 2, sets the automatic air speed control 93a into operation and turns over control to the system, as by means 64f and 82b. The closing of switch 55—55a puts the circuit through relay coil 33a in position to operate when contacts 51 and 51a close. When the airplane reaches the point 14, Figure 1, the marker beacon signal 10 operates through antenna 46, receiver 47, amplifier 48, modulation filter 49, and relay coil 50, closing contacts 51 and 51a and energizing holding coil 50a. This moves contacts 27, 28 and 29 of multiple-pole double-throw switch 23 to the left, out of contact with contacts 30, 31 and 32 (taking the vertical controlling elements off the automatic pilot), and into contact with contacts 24, 25 and 26, respectively, thus putting the vertical controlling elements of the system on to the landing beam course indicator 16.

At the same time switch 51—51a closes, the signal 55a indicates to the pilot that it is time to set volume control 15a so as to bring indicator 22a to zero reading, thus setting arm 19 at the neutral position and determining the intensity of the constant intensity curve, or glide path, which will be followed to earth.

The closing of contacts 51 and 51a also, through control of timer 58 by means 56, allows armature 59 to operate a sufficient length of time on gear drive 62 to move the elevator rudder 71 a sufficient amount to nose the plane down on to the glide course selected. If the airplane goes above this selected course 3, Figure 1, contact 20 will touch 21 and reversing switch 35 will operate to run armature 59 in a direction to operate elevator rudder 71 in a direction to lower the plane. Conversely, if the airplane at 13, Figure 1 goes below course 3 by a predetermined amount contact 20 will touch contact 22 and operate through reversing switch 35 and reverse the direction of rotation of armature 59, thus causing rudder 71 to move in a direction to nose the plane upward. In this way airplane 13, Figure 1, is automatically held on the proper glide course 3 where the received signal from the landing beam transmitter 12 is of constant intensity. The timing device 58 is for the purpose of preventing an over-operation of rudder 71 in either direction during the glide and its time element of operation is adjusted to fit the need of the aircraft upon which it is installed. When the airplane reaches the radiated field 12, Figure 1, of the marker beacon 11, antenna 46 receives the signal which passes through receiver 47, amplifier 48, and modulation filter 73, to relay coil 74. This coil closes contacts 77 and 77a and works through motor 79 to apply the air brakes 83. Coil 86 of the magnetic brake 86a is excited also and in the operation of cable 81 serves also to rotate drum 85 which in turn moves rudder 71 by a predetermined amount to put the aircraft in an attitude for landing. At the same time the automatic air speed indicating apparatus is thrown off by the excitation of coil 93b (switch 93a having been closed) and spring 94 returns valve 99 to a predetermined off-position sufficient to keep the engine at idling speed, the maintenance of this off position being sustained by holding coil 93f. In this way the various controlling elements of the aircraft are adjusted automatically, putting the aircraft in a position such that it will touch the ground at point 13 in a normal fashion.

As above noted, when no far beacon signal is available, a standard setting of volume control 15a may be used, and closing of switch 55 on point 55b will put the circuit through relay coil 33a in position to operate when points 49a and 49c close. The system then operates as before described, following the standard-pre-selected glide course corresponding to the standard setting of 15a, in lieu of one selected by the pilot after noting signal 55a.

It is apparent that in lieu of marker beacons other forms of signals may be used, for example, a signal sent from a control point at a time corresponding with a given position of the aircraft when a change of its flying attitude is desired, and that systems based upon this invention, while particularly adapted for automatic landing of aircraft, may be used for other automatical maneuvering as well.

Thus, the embodiment disclosed herein and the references thereto in the following claims are to be interpreted illustratively and not restrictively, as various changes may be made in mode of control and apparatus within the scope of this invention.

What I claim is:

1. In a system for blind landing of aircraft employing a landing surface, a glide beam beacon providing a course in the vertical plane associated with said landing surface along which the field intensity set up by said glide beam beacon is constant, a runway localizer beacon providing a lateral course indication in the field of said glide beam beacon, and far and near marker beacons on said runway localizer course indication in line with the field radiated by said glide beam beacon, operating on the same radio frequency but with different modulation frequencies; said far marker beacon being at a distance from said landing area, and said near marker beacon being closely associated with said landing area; an aircraft having the usual engine, lateral controlling rudder means, elevator rudder means, and air-brake means, said aircraft having receiving means for said glide beam beacon radiation with manual sensitivity control, receiving means for said runway localizer beacon, and receiving means for said marker beacons with selectors for the two modulation frequencies, means associated with the lateral controlling means of said aircraft and actuated by said runway localizer beacon receiver output for maintaining said aircraft substantially on said runway course, elevator rudder control means actuable by the output of said glide beam receiving means operably associable with the elevator rudder of said aircraft and operable to move the said rudder in a direction depending upon the direction of deviation of the aircraft from the glide course, such as to return it to the glide course, said elevator rudder control means including timing means normally limiting its moving of the rudder to a predetermined length of time within a given element of time, means actuated by said far marker modulation selector for initiating control of the elevator rudder of said aircraft by the output of said glide beam receiver, for giving a signal to the pilot, and for modifying control of said elevator rudder by said elevator rudder control means in a manner to accelerate movement of the rudder to a glide position, readable glide beam course indicating means controllable by said manual sensitivity control to select the constant intensity glide course to be followed, air speed responsive means associated with said aircraft and operable to maintain it at a substantially constant air speed at least during the major portion of glide, means actuated by said near marker modulation selector for putting the air brakes of said aircraft into operation, for setting said elevator rudder at a landing position, and for cutting the engine speed down, from that maintained during glide, to a predetermined number of revolutions per minute, means operable by the pilot to enable manual control of the aircraft to be assumed during the glide, and selectively operable means for initiating glide in response to an intensity of glide beam field corresponding to a predetermined sensitivity setting, whereby said aircraft may be caused to follow said glide and runway localizer beam courses substantially to said landing surface and assume a landing attitude, subject however, to the will of the pilot.

2. In a system for vertical guidance of an aircraft during landing, employing a landing surface, a glide beam beacon providing a course in the vertical plane associated with said landing surface along which the field intensity set up by said glide beam beacon is constant, and far and near marker beacons in line with the field radiated by said glide beam beacon and operating on the same radio frequency but with different modulation frequencies, said far marker beacon being at a distance from said landing area and said near marker beacon being closely associated with said landing area; an aircraft having the usual engine, elevator rudder means, and air-brake means, said aircraft having receiving means for said glide beam beacon radiation with manual sensitivity control and receiving means for said marker beacons with selectors for the two modulation frequencies, elevator rudder control means actuable by the output of said glide beam receiving means operably associable with the elevator rudder of said aircraft and operable to move the said rudder in a direction depending upon the direction of deviation of the aircraft from the glide course, such as to return it to the glide course, means actuated by said far marker modulation selector for initiating control of the elevator rudder of said aircraft by the output of said glide beam receiver, for giving a signal to the pilot, and for modifying control of said elevator rudder by said elevator rudder control means in a manner to accelerate movement of the rudder to a glide position, readable glide beam course indicating means controlled by said manual sensitivity control to select the constant intensity glide course to be followed, air speed responsive means associated with said aircraft and operable to maintain it at a substantially constant air speed at least during the major portion of glide, means actuated by said near marker modulation selector for putting the air brakes of said aircraft into operation, for setting said elevator rudder at a landing position, and for cutting the engine speed down, from that maintained during glide, to a predetermined number of revolutions per minute, and means operable by the pilot to enable manual control of the aircraft to be assumed during the glide.

3. In a system for blind landing of aircraft employing a landing surface, and a glide beam beacon providing a constant field intensity course in a vertical plane associated with said landing surface, an aircraft having the usual engine, elevator rudder means, and air-brake means, said aircraft having receiving means for said glide beam beacon radiation, elevator rudder control means actuable by the output of said glide beam receiving means and operable to move the elevator rudder of said aircraft in a direction depending upon the direction of deviation of the aircraft from the glide course, such as to return it to the glide course, means responsive to a predetermined intensity of glide beam field for initiating control of the elevator rudder of said aircraft by the output of said glide beam receiver and for modifying control of said elevator rudder by said elevator rudder control means in a manner to accelerate movement of the rudder to a glide position, air speed responsive means associated with said aircraft and operable to maintain it at a substantially constant air speed at least during the major portion of glide, means, as a near marker signal, for indicating close approach to said landing surface, means responsive to the close-approach indication of said last named means for putting the air brakes of said aircraft into operation, for setting said elevator rudder at a landing position, and for cutting the engine speed down, from that maintained during glide, to a predetermined number of revolutions per minute, and means operable by the pilot to enable manual control of the aircraft to be assumed during the glide.

4. In a system for vertical guidance of an aircraft during landing employing a landing zone provided with a glide beam beacon having an output signal which increases in intensity with altitude, an aircraft having the usual engine and elevator rudder means, said aircraft having receiving means for said glide beam beacon signals, means associated with said receiving means and with the elevator rudder of said aircraft for operating the elevator rudder of said aircraft in a direction to raise said aircraft when the signals received from said glide beam beacon fall below a predetermined intensity as the landing area is approached and for operating the elevator rudder in a direction to lower said aircraft when the signals received from said glide beam beacon increase above a predetermined intensity as said landing zone is approached, an engine speed control and an air speed indicator on said aircraft having its output associated with said engine speed control so that said aircraft is held at a substantially constant air speed; such that said aircraft will follow at substantially constant speed a predetermined landing glide path to said landing zone.

5. In a system for flying of aircraft, the combination with a beacon, providing a course in a vertical plane, and a beacon providing a course in a horizontal plane, and marker signal means suitably located along the said course in the horizontal plane; of an aircraft provided with means responsive to the signals of said beacons for automatically offsetting departure of the aircraft from a three dimensional course, comprising the said vertical and horizontal courses, and further provided with means responsive to the signals of said marker signal means for automatically initiating changes of control settings of said aircraft as said marker signals are received to prepare the aircraft for the succeeding flying attitude.

6. In a system for flying of aircraft, in combination, means providing vertical and horizontal course indicating signals and means providing marker signals radiated vertically through said vertical and horizontal courses, and suitably located laterally thereto, and an aircraft provided with means responsive to said vertical and horizontal course indicating signals operable to offset departure of the aircraft from a three dimensional course defined thereby, and further provided with means responsive to said marker signals operable to prepare the aircraft for a succeeding flying attitude in said three dimensional course.

7. In a system for vertical control of an aircraft in proximity to an air-port, having a runway locus provided with a beam beacon defining vertical guidance constant intensity courses and further provided with means for propagating a marker signal vertically at the approach end of said runway locus, an aircraft having controls including vertical guidance elements, means on said aircraft responsive to variations in the intensity of the field of said beam beacon and operable on said vertical guidance elements to offset deviation of said aircraft from one of said constant intensity courses and thus effect an automatic glide of the aircraft, and means on said aircraft responsive to said marker signal operable on the controls of said aircraft to effect a major change in the flying attitude of the aircraft at the related end of and cooperable with its automatic glide.

8. In a system for control of an aircraft in proximity to an airport having a runway locus provided with a marker beacon located at the approach end of said runway locus and generating a continuous signal, an aircraft having controls including guiding elements, and means on said aircraft responsive to the signal of said marker beacon and operable on said controls to effect a major change in the flying attitude of the aircraft.

9. Mechanism for controlling the engine speed of an aircraft in flight, comprising air speed responsive means, an engine speed control having a landing speed position, means actuated by said air speed responsive means and so associated with said engine speed control as to vary the engine speed inversely with reference to changes of the air speed to produce general adherence to a constant air speed, and radiant energy responsive means for automatically cutting out control by said air speed responsive means, said mechanism including means for placing the engine speed control in its landing-speed position upon cutting out of control by said radiant energy responsive means.

10. In a system for three dimensional guidance of an aircraft, as during landing; which employs beacon means of the glide beam type setting up radiant energy altitude paths in space, along which the field intensity is constant, but above and below which the field intensity changes from the constant value; and which further employs therewith beacon means providing azimuthal course defining radiant energy signals of the equisignal double modulation type in the said field of constant intensity altitude paths and defining therewith definite three dimensional azimuthally directive radiant energy traces in space. an aircraft having the usual lateral controlling rudder means and elevator rudder means, means on said aircraft receiving the radiant energy of said field of constant intensity paths; elevator rudder control means actuable, by changes of the output intensity derived from reception of said field as the aircraft departs from the altitude trace of a selected one of the constant intensity paths, for operating the elevator rudder of said aircraft in a direction to return the aircraft to the altitude trace of said selected path; means on said aircraft receiving the two modulations of said double modulation signals; and means, actuable selectively by preponderance of one or the other of the respective modulations in the output derived from reception of said double-modulation signals, for operating the lateral controlling rudder means of said aircraft, as the aircraft departs from the equisignal course of azimuthal direction, in a direction to return the aircraft to the azimuthal trace of said equisignal course; whereby compensation for drift due to cross-winds is achieved and the flight course of the aircraft is caused to follow the selected one of the three dimensional azimuthally directive radiant energy traces in space.

FRANCIS W. DUNMORE.